United States Patent
Yanagisawa

(10) Patent No.: US 6,858,164 B2
(45) Date of Patent: Feb. 22, 2005

(54) SILICONE-OIL SOLUBLE POLYMER, IMAGE DISPLAY MEDIUM USING THE SILICONE-OIL SOLUBLE POLYMER AND IMAGE DISPLAY DEVICE USING THE IMAGE DISPLAY MEDIUM

(75) Inventor: Masahiro Yanagisawa, Kanagawa-ken (JP)

(73) Assignee: Ricoh Company Limited, Tokyo (JP)

(*) Notice: Subject to any disclaimer, the term of this patent is extended or adjusted under 35 U.S.C. 154(b) by 0 days.

(21) Appl. No.: 10/055,905

(22) Filed: Jan. 28, 2002

(65) Prior Publication Data

US 2002/0146572 A1 Oct. 10, 2002

(30) Foreign Application Priority Data

Jan. 26, 2001 (JP) ........................................ 2001-019234
Mar. 14, 2001 (JP) ........................................ 2001-071966

(51) Int. Cl.[7] .................... G02F 1/15; G02F 1/167; C08F 30/08; C08L 83/10
(52) U.S. Cl. ................. 252/583; 252/585; 252/586; 345/107; 359/296; 524/268; 524/588; 528/25; 528/26; 528/26.5; 528/28; 528/29; 528/32; 528/33; 528/41; 526/279
(58) Field of Search ............. 345/107; 359/296; 524/268, 588; 528/25, 26, 26.5, 28, 29, 32, 33, 41; 252/583, 585, 586; 526/279

(56) References Cited

U.S. PATENT DOCUMENTS

| 5,998,498 A | * | 12/1999 | Vanderlaan et al. | ........ 523/107 |
| 6,300,932 B1 | * | 10/2001 | Albert | ........................ 345/107 |
| 6,367,929 B1 | * | 4/2002 | Maiden et al. | .......... 351/160 H |
| 6,542,284 B2 | * | 4/2003 | Ogawa | ....................... 359/296 |
| 2001/0049400 A1 | * | 12/2001 | Alli et al. | ...................... 522/4 |
| 2002/0044333 A1 | * | 4/2002 | Shigehiro et al. | ........... 359/296 |
| 2002/0180687 A1 | * | 12/2002 | Webber | ...................... 345/107 |

FOREIGN PATENT DOCUMENTS

| JP | 40-7047 | 4/1965 |
| JP | 59-213428 | 12/1984 |
| JP | 1-300231 | 12/1989 |
| JP | 5-173194 | 7/1993 |

OTHER PUBLICATIONS

F.A. Waite, "The development of graft copolymers as macromolecular surfactants for use in non–aqueous media", J. Oil. Chem. Assoc., vol. 54, pp. 342–350, 1971.

* cited by examiner

*Primary Examiner*—Jeffrey B. Robertson
(74) *Attorney, Agent, or Firm*—Oblon, Spivak, McClelland, Maier & Neustadt, P.C.

(57) ABSTRACT

An image display medium including: a pair of electroconductive layers, at least one of which is light-transmissive and which are opposed to each other to form a cell; and a dispersion contained in the cell and including a silicone oil; a colored particulate material dispersed in the silicone oil; and a polymer soluble in the silicone oil. The polymer preferably includes units obtained from a monomer having an acidic group or a basic group and a monomer having the following formula (1):

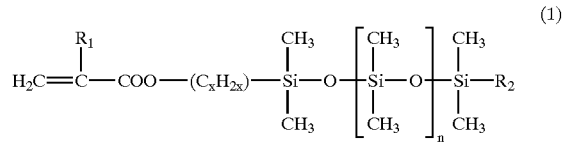

wherein $R_1$ represents a hydrogen atom or a methyl group; $R_2$ represents a hydrogen atom or an alkyl group having 1 to 4 carbon atoms; n is an integer; and x is an integer of from 1 to 3.

13 Claims, 4 Drawing Sheets

SILICONE-OIL SOLUBLE POLYMER, IMAGE DISPLAY MEDIUM USING THE SILICONE-OIL SOLUBLE POLYMER AND IMAGE DISPLAY DEVICE USING THE IMAGE DISPLAY MEDIUM

BACKGROUND OF THE INVENTION

1. Field of the Invention

The present invention relates to a silicone-oil soluble polymer and to an image display medium using the silicone-oil soluble polymer. More particularly the present invention relates to an image display medium in which an image is reversibly displayed by the movement of charged white or colored particles upon application of an electric field thereto. In addition the present invention relates to an image display device.

2. Discussion of the Background

Display devices such as cathode ray tubes (CRTs) and liquid crystal displays (LCDs) have been used as an image display terminal for displaying images such as letters, static images and moving images. These devices can instantaneously display images (i.e., digital data) and rewrite the images. However, these devices have various drawbacks. For, example, it is a hard work to always carry such devices. In addition, to see such a display device for a long period of time causes eye fatigue. Further, when such a display device displaying images is turned off, the images are disappeared.

When images such as letters and static images are distributed or stored as a document, the images are typically recorded by a printer on a paper medium to form a hardcopy. Images on such a hardcopy are easier to read than those in the display devices mentioned above. In addition, when reading images on hardcopies, the degree of eye fatigue is much less than that when reading images in the display devices. Further, a reader can see images on hardcopies while having a free posture. Furthermore, hardcopies can be easily carried because of having lightweight. However, hardcopies have a problem in view of material saving such that much labor and costs are necessary to recycle used hardcopies.

Therefore, a need has been existed for a paper-like image display medium having a combination of the advantages of the above-mentioned display devices and the advantages of hardcopies. Until now, display media using a liquid crystal dispersed in a polymer, a bistable cholesteric liquid crystal, an electrochromic material or an electrophoretic material have been proposed. These media are a reflection type and therefore can display high contrast images. In addition, the media can be used as a memorable display medium (i.e., the media have an image maintaining ability even when the power is off). Among these media, devices using an electrophoretic material have good display qualities and low power consumption and therefore are advantageous over other media. A typical embodiment of the electrophoretic display media, which is disclosed in Japanese Laid-Open Patent Publication No. 5-173194 or Japanese Patent No. 2,612,472 (i.e., Japanese Laid-Open Patent Publication No. 1-300231), is illustrated in FIG. 3.

In FIG. 3, numerals 6 and 6' denote transparent substrates made of glass. Numerals 7 and 7' denotes pattern electrodes formed on the substrates 6 and 6', respectively. A dispersion 8 including a dispersing medium and electrophoretic particles whose color is different from the color of the dispersing medium are contained in the cell formed of the pair of substrates 6 and 6'. The surfaces of the electrophoretic particles are charged in the dispersing medium. When a voltage having a polarity opposite to the charge of the electrophoretic particles is applied to the electrode 7, the particles move toward the electrode 7, resulting in deposition of the particles on the electrode 7. To the contrary, when a voltage having the same polarity as the charge of the electrophoretic particles is applied to the electrode 7, the particles move toward the substrate 6', and thereby the color of the dispersing medium can be seen from the side of the electrode 7. Thus, images can be reversibly displayed. When the dispersion 8 is simply contained in the cell without providing spacers 9, uneven images are often displayed due to aggregation of the electrophoretic particles and adhesion of the particles to the electrode 7. Therefore, a mesh-like or porous spacer 9 is preferably provided in the cell to stably display images. In the display device having such a construction, it is difficult to evenly contain the dispersion into the thus separated cells. Alternatively, there occurs a problem such that when the dispersion is contained in the cell, the properties of the dispersion often change, and thereby it becomes difficult to stably produce a display medium capable of displaying images having a desired image qualities.

It is well known that the dispersion of the particles can be stabilized by electrostatic repulsion effect and a stereo effect (i.e., a so-called adsorption layer effect). With respect to the electrostatic repulsion effect, a DLVO theory is established. In this theory, the thickness of the electric double layer and the phase boundary potential (i.e., the so-called $\zeta$ potential) are important factors. Therefore, ions for forming such an electric double layer and a phase boundary potential are needed. Several investigations have been made for aqueous dispersion in which ions can be present.

With respect to the stereo effect, a theory corresponding to the DLVO theory has not yet been established. An investigation using a non-aqueous dispersion system (e.g., petroleum solvent dispersion systems) is reported by F. A. Waite in J. Oil Col. Chem. Assoc., 54, 342 (1971). This investigation relates to a fundamental method for manufacturing a stable non-aqueous solvent dispersion. In this method, a block or graft copolymer which has both a component having an affinity for the particles dispersed in a dispersing medium and another component soluble in the dispersing medium is used.

Japanese Patent Publication No. (hereinafter referred to as JPP) 40-7047 discloses a method for manufacturing a dispersion, which utilizes the above-mentioned method. In the method, methyl methacrylate is radically polymerized in a hydrocarbon solvent in the presence of a degradable rubber to prepare a stable polymethyl methacrylate dispersion. It is considered that methyl methacrylate is graft-copolymerized with the degradable rubber because it is unlikely that the polymethyl methacrylate particles adsorb the degradable rubber. In addition it is considered that when the graft copolymer is included in a display dispersion, the insoluble part of the graft copolymer associates with the surface of particles therein, and the soluble part of the graft copolymer has a stereo effect. Thus, the dispersion stability of the particles can be maintained.

However, a method by which solid particles are stable dispersed in a non-aqueous solvent such as nonpolar aprotic solvent (e.g., petroleum solvents) by ionically charging the solid particles is not yet known. Therefore, dispersions used for electrodeposition paints, electrophotographic liquid developers and display devices have a short life.

In attempting to solve this problem, JPP 8-23005 (i.e., Japanese Laid-Open Patent Publication No. 59-213428)

discloses a dispersion in which solid particles are charged in a solvent, such as aliphatic hydrocarbons and aromatic hydrocarbons, using an acid-base ion dissociation. On the other hand, it is preferable not to use solvents such as hydrocarbons and aromatic hydrocarbons in view of environmental protection. Therefore, now silicone oils are used as a substitute of such solvents. However, a method by which solid particles are ionically charged in a silicone oil to stably disperse the particles therein is not yet known until now. Therefore, if the technique of the dispersion described in JPP 8-23005 is merely applied to a dispersion including a silicone oil, a stable dispersion cannot be obtained. Namely, a material which can effectively charge solid particles in a silicone oil is not yet known.

Because of these reasons, a need exists for an image display medium which can reversibly display high quality images for a long period of time even when a silicone oil is used as a dispersing medium and which has an image maintaining ability and high response.

SUMMARY OF THE INVENTION

Accordingly, an object of the present invention is to provide a material which can effectively charge solid particles in a silicone oil.

Another object of the present invention is to provide an image display medium which can reversibly display high quality images for a long period of time even when a silicone oil is used as a dispersing medium and which has an image maintaining ability and make a quick response to applied voltage.

Briefly these objects and other objects of the present invention as hereinafter will become more readily apparent can be attained by a polymer which is soluble in a silicone oil and which includes units obtained from a first monomer having an acidic group or a basic group, and a second monomer having the following formula (1):

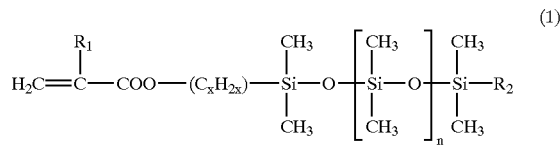

wherein $R_1$ represents a hydrogen atom or a methyl group; $R_2$ represents a hydrogen atom or an alkyl group having 1 to 4 carbon atoms; n is an integer; and x is an integer of from 1 to 3.

In formula (1), $R_1$ and $R_2$ are preferably a methyl group, n is preferably from 2 to 200 and more preferably from 5 to 100, and x is preferably 2.

It is preferable that the polymer includes units obtained from a third monomer having a nonionic polar group (such as a hydroxyl group, an ester group, an ether group, a ketone group, an aldehyde group, a halogen group and an amino group) other than oxyalkylene groups and polyoxyalkylene groups, and/or a fourth monomer having the following formula (2):

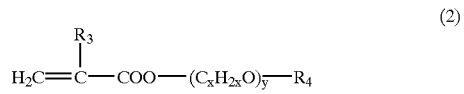

wherein $R_3$ represents a hydrogen atom or a methyl group; $R_4$ represents a hydrogen atom or an alkyl group having 1 to 4 carbon atoms; x is an integer of from 1 to 3; and y is an integer of from 1 to 25.

In formula (2), $R_3$ and $R_4$ are preferably a methyl group, x is preferably 2 and y is preferably from 1 to 20 and more preferably from 2 to 10.

The polymer of the present invention mentioned above can generate ions in a silicone oil by inducing acid-base dissociation and thereby colored particles can be charged even in the silicone oil which is a non-polar solvent.

In another aspect of the present invention, an image display medium including a pair of electroconductive layers, at least one of which is light-transmissive and which are opposed each other to form a cell; and a dispersion contained in the cell, wherein the dispersion includes a silicone oil; a colored particulate material dispersed in the silicone oil; and a polymer soluble in the silicone oil.

The resin soluble in the silicone oil is preferably the polymer of the present invention mentioned above.

In yet another aspect of the present invention, an image display medium including a pair of electroconductive layers, at least one of which is light-transmissive and which are opposed each other to form a cell; and a dispersion contained in the cell, wherein the dispersion includes a silicone oil and a colored particulate material dispersed in the silicone oil and having an acidic group or a basic group.

The dispersion preferably include a polymer soluble in the silicone oil, which preferably has a basic group or an acidic group.

It is preferable that the polymer has a basic group or an acidic group, wherein when the colored particulate material has an acidic group, the polymer has a basic group, and when the colored particulate material has a basic group, the polymer has an acidic group.

It is preferable that the colored particulate material further has a nonionic polar group.

The colored particulate material preferably includes a combination of a coloring agent with a binder resin insoluble in the silicone oil and having the basic group or the acidic group, or a coloring agent which is grafted with a monomer having the basic group or an acidic group.

In the image display medium of the present invention, the dispersion preferably includes water in an amount of from 100 to 2000 ppm based on total weight of the dispersion.

In a further aspect of the present invention, an image display device is provided which include the image display medium and at least one member selected from the group consisting of voltage applicators configured to apply a voltage between the pair of electroconductive layers to display an image in the image display medium and connectors through which a voltage is applied to the image display medium to display an image therein.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION OF THE INVENTION

The polymer of the present invention, which is soluble in a silicone oil, can generate ions in a silicone oil by inducing acid-base dissolution, and thereby particles in the silicone oil can be charged even though the silicone oil is a non-polar solvent.

The image display medium of the present invention will be explained in detail referring to drawings.

Figure 1:
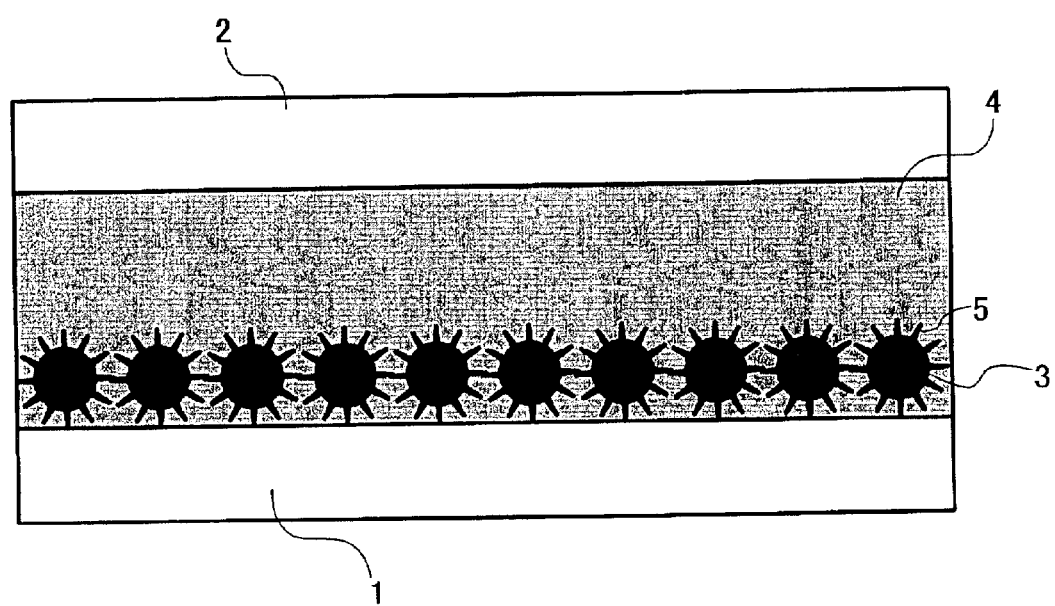
FIG. 1 is a schematic view illustrating the cross section of an embodiment of the image display medium of the present invention.

FIG. 1 is a schematic view illustrating the cross section of an embodiment of the image display medium of the present invention. In FIG. 1, numerals land 2 denote electroconductive layers. One or both of the layers 1 and 2 are light-transmissive. The layers 1 and 2 form a cell in which a dispersion including a colored electrophoretic particulate material 3 (hereinafter simply referred to colored particles 3) which has a white color or a color other than white, a silicone oil solvent 4 and a resin 5 soluble in the silicone oil solvent 4 The resin 5 is the polymer of the present invention. A dye having a color different from the color of the colored particles 3 and soluble in the silicone oil solvent 4 is preferably dissolved in the solvent 4 to color the solvent 4 It is preferable that the resin 5 is adsorbed on the colored particles 3 so that the dispersion of the colored particles 3 can be improved due to the steric effect of the colored particles 3 on which the resin 5 is adsorbed.

Figure 2A:
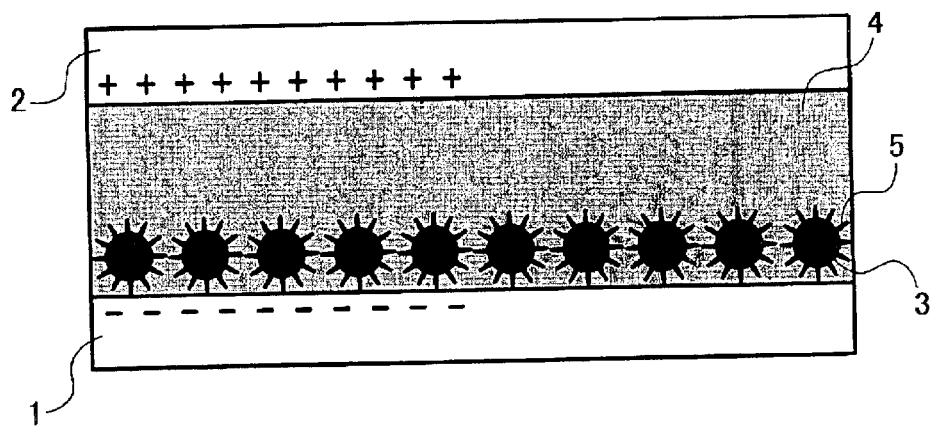
FIGS. 2A–2C are schematic views for explaining how an image is formed in the image display medium of the present invention.
Figure 2B:
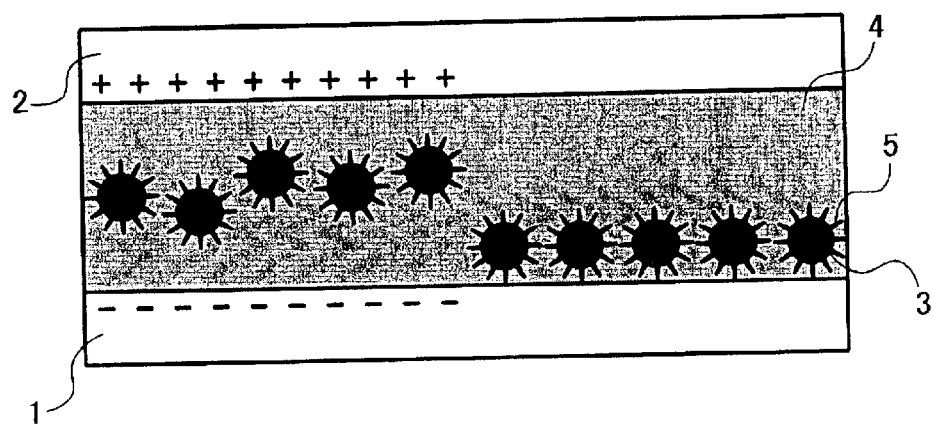
Figure 2C:
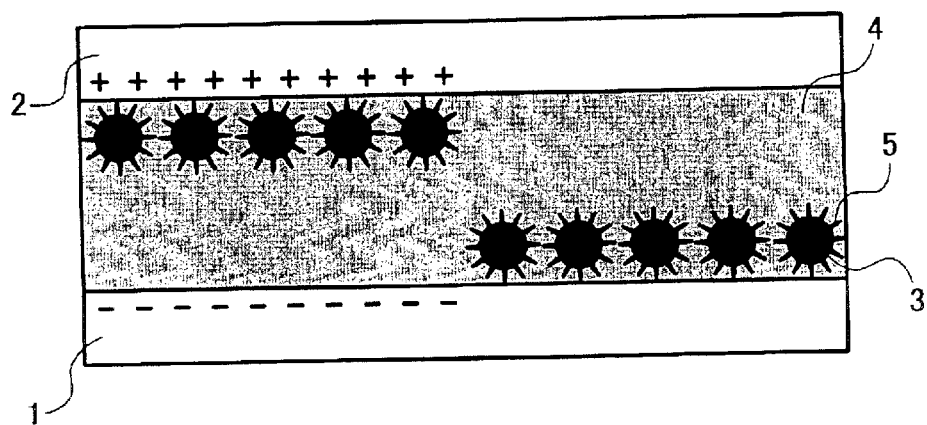
Figure 3:
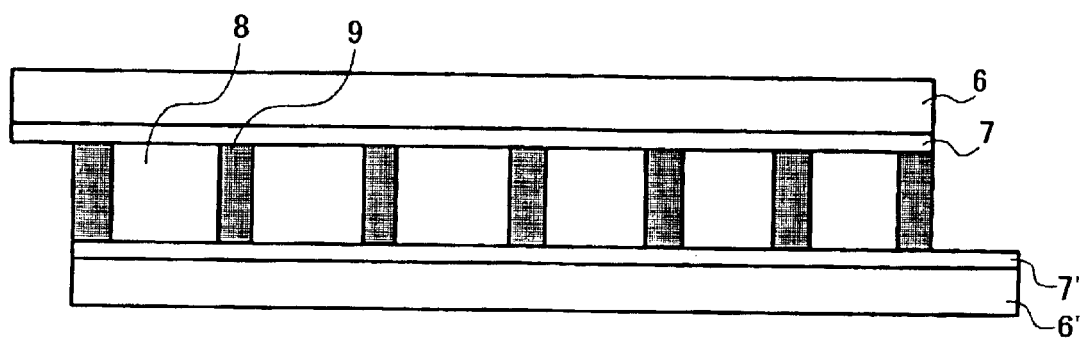
FIG. 3 is a schematic view illustrating the cross section of a conventional image display medium.

FIGS. 2A–2C are cross-sectional views for explaining the image displaying mechanism of the image display medium of the present invention. In FIG. 2A, the cell formed by electrodes 1 and 2 is separated by a spacer (not shown) to form a left cell and a right cell. When a charge (hereinafter referred to as an external charge) is applied from outside by a proper charge applicator (i.e., a voltage applicator) to the dispersion included in the left cell, the colored particles 3 which have a charge, moves upward due to the electric field formed by the external charge as shown in FIG. 2B. As shown in FIG. 2C, the colored particles 3 finally reach the electroconductive layer 2. At this point, the colored particles 3 electrostatically adheres to the layer 2 resulting in termination of movement of the colored particles 3. When the image display medium is seen from a point over the layer 2 the left side of the display medium in FIG. 2C has the color of the colored particles 3 and the right side of the image display medium has the color of the dye added to the silicone oil solvent 4.

This image display process can be reversibly performed by changing the polarity of the applied voltage, and therefore the image display medium can be repeatedly used.

When the resin 5 has an acidic group and does not have a basic group, the colored particles 3 on which the resin is adsorbed can be charged positively, and thereby movement of the colored particles 3 can be controlled well.

To the contrary, when the resin 5 has a basic group and does not have an acidic group, the colored particles 3 on which the resin is adsorbed can be charged negatively, and thereby movement of the colored particles 3 can also be controlled well.

When the resin 5, which has an acidic group or a basic group, further has a nonionic polar group, the quantity of the charge generated increases due to salvation of the acidic group or basic group, and thereby the speed of response of the colored particles 3 to applied voltage can be enhanced (i.e., images can be rapidly formed).

Alternatively, the colored particles 3 may have an acidic group or a basic group.

When the colored particles 3 have an acidic group and does not have a basic group on the surface thereof, the colored particles 3 can be charged positively, and thereby movement of the colored particles 3 can be controlled well.

To the contrary, when the colored particles 3 have a basic group and does not have an acidic group on the surface thereof, the colored particles 3 can be charged negatively, and thereby movement of the colored particles 3 can also be controlled well.

It is preferable that the colored particles 3 further have a nonionic polar group on the surface thereof because the quantity of the charge generated increases due to salvation of the acidic group or basic group, and thereby the speed of response of the colored particles 3 to applied voltage can be enhanced (i.e., images can be rapidly formed).

When the dispersion includes a resin soluble in the silicone oil, the resin is adsorbed on the colored particles 3 and thereby the colored particles 3 can be stably dispersed due to steric effect of the resin 5 Thus, an image display medium which can stably form clear images reversibly for a long period of time can be provided.

In this case, it is preferable that when the colored particles 3 have an acidic group, the silicone-oil soluble resin 5 has a basic group, and when the colored particles 3 have a basic group, the silicone-oil soluble resin 5 has an acidic group. When the dispersion has such a construction, charges are generated due to acid-base dissociation occurring between the colored particles 3 and the silicone-oil soluble resin 5 and thereby the colored particles 3 can be stably dispersed due to steric effect of the resin 5 is adsorbed on the colored particles 3. Therefore the colored particles 3 are fully charged. Thus, an image display medium which can stably form clear images reversibly for a long period of time can be provided.

The present invention will be explained in more detail.

Silicone oils have the following advantages over water and other non-aqueous solvents.

(1) having a good high-temperature and low-temperature resistance;
(2) being chemically inactive;
(3) being odorless;
(4) viscosity thereof hardly changes even when temperature changes;
(5) being nonvolatile (in particular, for silicone oils having high viscosity);
(6) having low surface tension;
(7) having a water repellent property and an oil repellent property; and
(8) having good releasability.

Therefore, silicone oils are used for various fields such as the electrical industry field, mechanical industry field and chemical industry field.

As mentioned above, in conventional non-aqueous solvent type dispersions, in particular, in nonpolar aprotic solvent type dispersions, it is not clear whether ions or charges are present in the dispersions. The reason is considered to be that in such solvents an interaction (i.e., salvation) does not take place between ions and solvent molecules. This is also true for silicone oils. Therefore, the present inventors investigate silicone oil dispersions including (a) an organic material having an acidic group but not having a basic group, (b) an organic material having a basic group but not having an acidic group, and (c) an organic material which can be mixed with the silicone oil solvents and which has a nonionic polar group. At this point, one of the components (a) and (b) may be copolymerized with the component (c).

As a result of the investigation, it is discovered that the components (a) and (b) cause an acid-base ionic dissociation. In addition, it is discovered that an ion-dipole interaction (i.e., salvation) takes place. Namely, it is discovered that when the components (a), (b) and (c) are present in the solvent mentioned above, ions can be stably present in such a nonpolar aprotic solvent due to an acid-base dissociation with a salvation of the polar group of the component (c). This is true whether or not the components (a) and (b) are soluble in the solvent.

In addition, it is also discovered that when a particulate material such as pigments and metal oxides is further included in the system including the components (a), (b) and (c), the particulate material can be dispersed more stably. The reason is considered to be that the acidic or basic group of the components (a) and (b) is fixed on the particulate material by chemical bonding, adsorption, etc. Thereby ionic dissociation occurs at the interface between the surface of the particulate material and the solvent while the salvation of the component (c) takes place at the same time. As a result thereof, the particulate material is uniformly charged positively or negatively. Thus, the particulate material can be stably dispersed positively or negatively by the synergy effect of the electrostatic effect and the stereo effect.

In addition, the present inventors discover that the quantity of the ions and the charge quantity of the particulate material can be controlled by using suitable materials as the components (a), (b) and (c) and controlling the addition quantities thereof. The present invention is made based on this knowledge.

The constituents of the image display medium of the present invention will be explained in detail.

Suitable polymers for use as the silicone-oil soluble polymer include copolymers which are formed of at least the following monomers:

(1) an acrylic monomer having a dimethylpolysiloxane chain (i.e., a monomer having formula (1));
(2) a monomer having an acidic group or a basic group; and
(3) an acrylic monomer having an (poly) oxyalkylene chain and/or a monomer having a polar group (which are optionally used)

Then the monomers will be explained in detail.

At first, monomers having the following formula (1) will be explained.

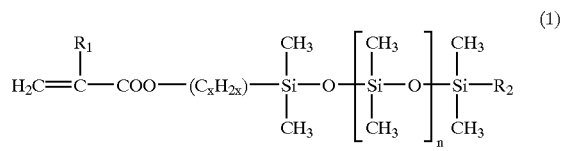

(1)

wherein $R_1$ represents a hydrogen atom or a methyl group; $R_2$ represents a hydrogen atom or an alkyl group having 1 to 4 carbon atoms; n is an integer; and x is an integer of from 1 to 3.

The monomers having formula (1) has high affinity for silicone oils and polymers formed of one or more of such monomers can be dissolved in silicone oils although general polymers cannot be dissolved in silicone oils. Even when one or more of such monomers are copolymerized with one or more of other monomers, the resultant copolymers have good affinity for silicone oils even though the resultant copolymers are soluble or insoluble in silicone oils.

Next, monomers having the following formula (2) will be explained.

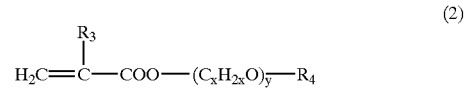

(2)

wherein $R_3$ represents a hydrogen atom or a methyl group; $R_4$ represents a hydrogen atom or an alkyl group having 1 to 4 carbon atoms; x is an integer of from 1 to 3; and y is an integer of from 1 to 25.

Since the monomers having formula (2) have a (poly) alkyleneglycol chain having a repeating number not greater than 25, copolymers formed of monomers including one or more of such monomers are adsorbed on particles insoluble in the silicone oil solvent used, and thereby dispersion of the particles in the silicone oil solvent can be stabilized due to the steric effect of the (poly)alkyleneglycol chain.

In the first embodiment of the present invention, a polymer (i.e., a silicone-oil soluble resin) formed of at least a monomer having an acid group and a monomer having formula (1) is used for the dispersion of the image display medium.

Specific examples of the silicone-oil soluble resins include copolymers of one or more of the monomers having formula (1), which have high affinity for silicone oils, with one or more of monomers having an acidic group such as (meth) acrylic acid, maleic acid, maleic anhydride, itaconic acid, itaconic anhydride, fumaric acid, cinnamic acid, crotonic acid, vinylbenzoic acid, 2-methacryloxyethylsuccinic acid, 2-methacryloxyethylmaleic acid, 2-methacryloxyethylhexahydrophthalic acid, 2-methacryloxyethyltrimellitic acid, vinylsulfonic acid, allylsulfonic acid, styrenesulfonic acid, 2-sulfoethyl methacrylate, 2-acrylamide-2-methylpropanesulfonic acid, 3-chloroamidephosphoxypropyl methacrylate, 2-methacryloyloxyethylacid phosphate and hydroxystyrene.

Among these copolymers, copolymers of (meth) acrylic acid with (meth)acryloxypropyl-modified polydimethylsiloxane are preferable, and copolymers of methacrylic acid with methacryloxypropyl-modified polydimethylsiloxane (n=5 to 100) are more preferable.

In the second embodiment of the present invention, a copolymer formed of at least a monomer having an acidic group, a monomer having formula (1) and a monomer having a nonionic polar group other than oxyalkylene groups and polyoxyalkylene groups is used for the dispersion of the image display medium of the present invention.

Specific examples of such monomers having a nonionic polar group include 2-hydroxyethyl (meth)acrylate, 2,3-dihydroxypropyl (meth)acrylate, 4-hydroxybutyl (meth) acrylate, 2-hydroxy-3-propyl methacrylate, 2-chloroethyl (meth)acrylate, 2,3-dibromopropyl (meth)acrylate, (meth) acrylonitrile, isobutyl-2-cyanoacrylate, 2-cyanoethyl acrylate, ethyl-2-cyanoacrylate, methacrylacetone, tetrahydrofurfurylmethacrylate, trifluoroethylmethacrylate, p-nitrostyrene, vinyl pyrrolidone, N-acryloylmorpholine, acrylamide, methacrylamide, N,N-dimethylmethacrylamide, N,N-dibutylmethacrylamide, etc.

Among these copolymers, copolymers of (meth) acrylic acid with (meth)acryloxypropyl-modified polydimethylsiloxane and one of 2-hydroxyethyl methacrylate, vinyl pyrrolidone, N-acryloylmorpholine and N,N-dimethylmethacrylamide are preferable, and copolymers of mechacrylic acid with methacryloxypropyl-modified polydimethylsiloxane (n=5 to 100) and one of 2-hydroxyethyl methacrylate, vinyl pyrrolidone and N-acryloylmorpholine are more preferable.

In the third embodiment, a copolymer formed of at least a monomer having an acidic group, a monomer having formula (1), which have high affinity for silicone oils, and a monomer having formula (2) is used for the dispersion of the image display medium of the present invention.

Among these copolymers, copolymers of (meth) acrylic acid with (meth)acryloxypropyl-modified polydimethylsiloxane and (poly)alkyleneglycol (meth)acrylate are preferable, and copolymers of mechacrylic acid with methacryloxypropyl-modified polydimethylsiloxane (n=5 to 100) and (poly)ethyleneglycol methacrylate (y=2 to 4) are more preferable.

In the fourth embodiment, a copolymer formed of a monomer having an acidic group, a monomer having formula (1), which has high affinity for silicone oils, a monomer having a nonionic polar group and a monomer having formula (2) is used for the dispersion of the image display medium of the present invention.

Among these copolymers, copolymers of (meth)acrylic acid with (meth)acryloxypropyl-modified polydimethylsiloxane, (poly) alkyleneglycol (meth) acrylate and one of 2-hydroxyethyl methacrylate, vinyl pyrrolidone, N-acryloylmorpholine and N,N-dimethylmethacrylamide are preferable, and copolymers of mechacrylic acid with methacryloxypropyl-modified polydimethylsiloxane (n=5 to 100), (poly)ethyleneglycol methacrylate (y=2 to 4) and one of 2-hydroxyethylmethacrylate, vinyl pyrrolidone and N-acryloylmorpholine are more preferable.

In the fifth embodiment, a copolymer which is formed of a monomer having formula (1) and a monomer having a basic group and which is soluble in silicone oils is used for the dispersion of the image display medium of the present invention.

Among these copolymers, copolymers of N,N-dialkylaminoethyl (meth)acrylate with (meth) acryloxypropyl-modified polydimethylsiloxane are preferable, and copolymers of N,N-dimethylaminoethyl methacrylate or N,N-diethylaminoethyl methacrylate with methacryloxypropyl-modified polydimethylsiloxane (n=5 to 100) are more preferable.

Specific examples of the monomers having a basic group include N-methylaminoethyl (meth)acrylate, N-ethylaminoethyl (meth)acrylate, N,N-dimethylaminoethyl (meth)acrylate, N,N-diethylaminoethyl (meth)acrylate, N,N-dibutylaminoethyl acrylate, N-phenylaminoethyl methacrylate, N,N-diphenylaminoethyl methacrylate, aminostyrene, dimethylaminostyrene, N-methylaminoethylstyrene, dimethylaminoethoxystyrene, diphenylaminoethylstyrene, N-phenylaminoethylstyrene, 2-N-piperidylethyl (meth) acrylate, 2-vinylpyridine, 4-vinylpyridine, 2-vinyl-6-methylpyridine, etc.

In the sixth embodiment, a polymer formed of at least a monomers having a basic group, a monomer having formula (1), which has high affinity for silicone oils, and a monomer having a nonionic polar group is used for the dispersion of the image display medium of the present invention.

In the seventh embodiment, a polymer formed of at least a monomer having a basic group, a monomer having formula (1), which has high affinity for silicone oils, and a monomer having formula (2), which can exert a steric effect, is used for the dispersion of the image display medium of the present invention.

In the eighth embodiment, a polymer formed of at least a monomer having a basic group, a monomer having formula (1), which has high affinity for silicone oils, a monomer having formula (2), which can exert a steric effect, and a monomer having a nonionic polar group is used for the dispersion of the image display medium of the present invention.

In the first to eighth embodiments, the above-mentioned monomers can be copolymerized with one or more other monomers.

Specific examples of such monomers include alkyl or aryl esters of (meth)acrylic acid such as 2-ethylhexyl (meth) acrylate, octyl (meth)acrylate, nonyl (meth)acrylate, decyl (meth)acrylate, lauryl (meth)acrylate, stearyl (meth) acrylate, vinyl laurate, lauryl methacrylamide, stearyl methacrylamide, methoxyethyle (meth)acrylate, ethoxyethyl (meth)acrylate, butoxyethyl (meth)acrylate, methyl (meth)acrylate, ethyl (meth)acrylate, butyl (meth)acrylate, hexyl (meth)acrylate, cyclohexyl (meth)acrylate, benzyl (meth)acrylate, and phenyl (meth)acrylate; styrene, vinyl toluene, vinyl acetate, etc.

Next, a ninth embodiment of the present invention, i.e., the image display medium of the present invention, will be explained in detail referring to FIG. 1.

In FIG. 1, at least one of the electroconductive layers 1 and 2 is light-transmissive. The electroconductive layers 1 and 2 can be formed, for example, by any one of the following methods:

(1) forming a thin layer of a metal such as Al, Ag, Ni and Cu or a transparent electroconductive material such as ITO (indium tin oxide), $SnO_2$ and ZnO:Al by a method such as sputtering, vacuum evaporation, CVD (chemical vapor deposition) or coating methods; and (2) forming a layer by coating a coating liquid in which an electroconductive material is mixed with a solvent optionally together with a binder such as resins and then drying the coated liquid.

Specific examples of such electroconductive materials include cationic polymer electrolytes such as polymethylbenzyltrimethylammonium chloride, and polyallylpolymethylammonium chloride; anionic polymer electrolytes such as polystyrenesulfonic acid salts and polyacrylic acid salts; and electronic conductors such as zinc oxide, tin oxide and indium oxide. The electroconductive layers maybe so thick as to have a self-holding function (namely, the layers are so thick to form a cell by themselves). Alternatively, the electroconductive layer may be formed on a substrate having a self-holding function, such as glass plates and plastic plates.

The electroconductive layers 1 and 2 may be a layer having an aeolotropic conductivity, or a layer having a patterned or multi-dot segment in which a conductive portion is formed through the thickness direction of the layer. In any case, when an electrode of a power supply is contacted with the electroconductive layers 1 and 2, an electric field can be formed between the electroconductive layers 1 and 2. Thus, images can be easily formed by simply applying an imagewise voltage with a voltage applicator to the electroconductive layers 1 and 2 to move the colored particles. Therefore this image forming method (i.e., image display device) is very simple. Alternatively, an image display device having a connector through which a voltage is applied by an external voltage applicator to from an image in the image display medium.

In FIG. 1, numeral 3 denotes colored particles. Typical examples of the colored particles include solid particles such as metal oxides. In addition, colored resin particles in which one or more coloring agents are dispersed in or mixed with a binder resin insoluble in silicone oils can also be used as the colored particles. Suitable binder resins for use in such colored resin particles include known thermoplastic resins and thermosetting resins, which are insoluble in silicone oils. Among these resins, resins which are not adhesive (i.e., not tacky) are preferably used.

Specific examples of such resins for use in the colored resin particles include polyester resins, and polymers of styrene and its derivatives such as polystyrene, poly-p-chlorostyrene and polyvinyl toluene.

Specific examples of the coloring agents for use in the colored resin particles include black coloring agents such as carbon blacks, aniline blacks, furnace blacks, and lamp blacks; cyan coloring agents such as Phthalocyanine Blue, Methylene Blue, Victoria Blue, Methyl Violet, Aniline Blue, and ultramarine blue; magenta coloring agents such as Rhodamine 6G Lake, dimethylquinacridone, Watchung Red, Rose Bengale, Rhodamine B, and Alizarine Lake; yellow coloring agents such as Chrome Yellow, Benzidine Yellow, Hansa Yellow, Naphthol Yellow, Molybdenum Orange, Quinoline Yellow, Tartrazine Yellow, etc. The content of the coloring agent in colored resin particles is from 0.1 to 300 parts by weight, and preferably from 1 to 100 parts by weight, per 10 parts by weight of the binder resin used.

In FIG. 1, numeral 4 denotes a silicone oil which serves as a dispersion medium. A silicone oil mixture can also be used as the solvent. Specific examples of silicone oils for use as the silicone oil solvent in the present invention include dialkylsilicone oils having the formula (3) mentioned below; cyclic polydialkyl siloxane or cyclic polyalkylphenyl siloxane; polyalkylphenyl siloxane; etc. In addition, silicone oils modified by a high fatty acid, methylchlorinated phenylsilicone oils alkyl-modified silicone oils, methylhydrodiene silicone oils, amino-modified silicone oils, epoxy-modified silicone oils or the like can also be used as the silicone oil solvent.

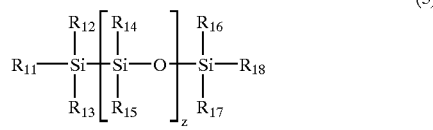

(3)

wherein $R_{11}$ to $R_{18}$ independently represent an alkyl group —$C_nH_{2n}$ wherein n is an integer of from 1 to 20; and z is 0 or an integer.

Dialkylsilicone oils having formula (3) have an advantages such that the polymer of the present invention can be polymerized in the oils at any temperature in a wide temperature range (when the oils are used as the dispersion medium). Among the dialkylsilicone oils, dimethylpolysiloxane is preferably used as the silicone oil solvent. In addition, among the dialkylsilicone oils, silicone oils having a viscosity of from 0.01 to 1,000,000 cs (centi-stokes) (more preferably from 0.5 to 1,000 cs) are preferably used as the silicone oil solvent, and z in formula (3) is preferably from 1 to 20,000.

When alkylphenylsiloxanes (in particular, methylphenylsilicone oils are preferably used) are used as the solvent, dispersion of the resin solution can be enhanced because the solvent has good dissolving ability, and therefore such silicone oils can be preferably used as the silicone oil solvent.

Specific examples of the dialkylsilicone oils include the following silicone oils as listed in Table 1.

TABLE 1

| Dialkylsilicone oils | Viscosity |
|---|---|
| Dimethylsilicone oils | 0.65, 1.0, 1.5, 10, 100, 500 |
| Diethylsilicone oils | 1, 5.5, 200, 3000 |
| Dibutylsilicone oils | 3, 15, 500, 60000 |
| Dihexylsilicone oils | 12, 25, 8000 |
| Dilaurylsilicone oils | 30, 1000, 60000 |
| Distearylsilicone oils | 100, 2000 |

Specific examples of cyclic polydialkylsiloxanes and cyclic polyalkylphenylsiloxanes include cyclic polydimethylsiloxanes, cyclic polymethylphenylsiloxanes, cyclic polydiethylsiloxanes, cyclic polyethylphenylsiloxanes, cyclic polydibutylsiloxanes, cyclic polybutylphenylsiloxanes, cyclic polydihexylsiloxanes, cyclic polyhexylphenylsiloxanes, cyclic polydilaurylsiloxanes, cyclic polymethylchlorophenylsiloxanes, cyclic polydistearylsiloxanes, cyclic polymethylbromophenylsiloxanes, etc.

Specific examples of the alkylphenylsilicone oils include the following silicone oils as listed in Table 2.

TABLE 2

| Alkylphenylsilicone oils | Content of phenyl group (mole %) |
|---|---|
| Methylphenylsilicone oils | 5, 10, 20, 50 |
| Ethylphenylsilicone oils | 5, 10, 20, 50 |
| Propylphenylsilicone oils | 5, 10, 20, 50 |
| Butylphenylsilicone oils | 5, 10, 20, 50 |
| Hexylphenylsilicone oils | 5, 10, 20, 50 |
| Octylphenylsilicone oils | 5, 10, 20, 50 |
| Laurylphenylsilicone oils | 5, 10, 20, 50 |
| Stearylphenylsilicone oils | 5, 10, 20, 50 |

Specific examples of the marketed products of such silicone oils include KF 96L (viscosity of 0.65, 1.0, 1.5, and 2.0 cs), KF-96 (viscosity of 10, 20, 30, 50, 500, 1000 and 3000 cs), KF-56, KF-58 and KF-54, which are manufactured by Shin-Etsu Chemical Co., Ltd.; TFS 451 series, TSF 456 series, TSF 410, 411, 440, 4420, 484, 483, 431, and 433 series, THF 450 series, TSF 404, 405, 406, 451-5A, 451-10A and 437 series, TSF 440, 400, 401, 4300, 4445, 4700, 4450, 4702 and 4730 series, TSF 434 and 4600 series, which are manufactured by Toshiba Silicone Co., Ltd.; SH200 manufactured by Dow Corning Toray Silicone Co., Ltd.; etc.

Other solvents can be added to the silicone oil solvent in an amount such that the characteristics of the silicone oil are not deteriorated. Specific examples of such solvents include aromatic hydrocarbons such as toluene, xylene and benzene; ethers; esters; alcohols; aliphatic hydrocarbons such as n-hexane, n-octane, iso-octane and iso-dodecane (for example ISOPAR H, G, L and V manufactured by Exxon Chemicals Co.; etc. These solvents can be used alone or in combination. The content of such solvents in the silicone oil solvent is preferably from 0.1 to 500 parts by weight, and more preferably from 0.5 to 10 parts by weight, per 100 parts by weight of the silicone oil used.

In the image display medium, one or more dyes, which have a color different from the color of the colored particles, are preferably added to the dispersion.

In FIG. 1, numeral 5 denote a resin soluble in the silicone oil solvent. Suitable resins for use as the silicone-oil soluble resin include known thermoplastic resins, and thermosetting resins, which are soluble in silicone oils. Among these resins, resins having stronger gravitation interaction with the surface of the colored particles used than that of the silicone oil solvent used are preferable. Namely, such resins are easily adsorbed on the colored particles, and the colored particles can be stably dispersed due to the steric effect of the resins. In view of the steric effect, copolymers formed of at least a monomer such as silicones, one or both ends of which are modified with methacryloxyalkyl, are preferably used. These silicones have high affinity for silicone oils and therefore are preferably used in the dispersion of the image display medium of the present invention.

The dispersion for use in the image display medium of the present invention can be prepared, for example, by mixing the components mentioned above in a silicone oil and dispersing the components therein. Suitable dispersion methods include known dispersion methods using ball mills, sand mills and attritors. The mixing order of the components is not particularly limited.

In the tenth embodiment, an image display medium containing a dispersion including the polymer of the first to third embodiments mentioned above as the silicone-oil soluble resin is provided. Namely, the polymer having an acidic group is used as the silicone-oil soluble resin. When such a polymer is used in the dispersion, the polymer is adsorbed on the surface of the colored particles used, and thereby the colored particles are charged positively.

In the eleventh embodiment, an image display medium containing a dispersion including the polymer of the fifth to seventh embodiments mentioned above as the silicone-oil soluble resin is provided. Namely, the polymer having a basic group is used as the silicone-oil soluble resin. When such a polymer is used in the dispersion, the polymer is adsorbed on the surface of the colored particles used, and thereby the colored particles are charged negatively.

In the twelfth embodiment, an image display medium containing a dispersion including the polymer of the second to fourth embodiments and the fifth to seventh embodiments mentioned above as the silicone-oil soluble resin is provided. Namely, the polymer has an acid group (or a basic group) and a nonionic polar group. When such a polymer is used in the dispersion, the polymer is adsorbed on the surface of the colored particles used, and thereby the colored particles are uniformly charged positively (or negatively).

In the thirteenth embodiment, an image display medium containing a dispersion including colored particles which include an anionic group (or a basic group) on the surface thereof is provided. The colored particles are uniformly charged in the silicone oil solvent positively (or negatively)

As the colored particles for use in the present embodiment, colored particles which include solid particles such as metal oxides mentioned above for use in the ninth embodiment; and a binder resin which is formed of at least a monomer having an acidic group (or a basic group) and which is insoluble in silicone oils can be used as the colored particles. When carbon blacks and metal oxides, on which a material can be grafted, are used as the solid particles, a monomer having an acid group (or a basic group) may be grafted on the solid particles.

In the fourteenth embodiment, an image display medium containing a dispersion including colored particles which include an acidic group (or a basic group) and a nonionic polar group on the surface thereof is provided. When such colored particles are used in the dispersion of the image display medium, the colored particles can be uniformly charged positively (or negatively).

As the colored particles for use in the present embodiment, colored particles in which a coloring agent such as solid particles (e.g., metal oxides) mentioned above for use in the ninth embodiment; and a binder resin having a nonionic polar group and an acidic group (or a basic group) and insoluble in silicone oils can be used as the colored particles. When such colored particles are used in the dispersion of the image display medium, the colored particles can be uniformly charged positively (or negatively). When carbon blacks and metal oxides, on which a material can be grafted are used as the solid particles, a monomer having a nonionic polar group and a monomer having an acid group (or a basic group) may be grafted on the solid particles.

In the fifteenth embodiment, an image display medium containing a dispersion including a silicone oil solvent, colored particles which include an acidic group (or a basic group) and optionally a nonionic group and a silicone-oil soluble resin is provided. Such a silicone-oil soluble resin is adsorbed on colored particles, dispersibility of the colored particles in silicone oils can be stabilized due to its steric effect. Suitable resins which can be dissolved in silicone oils include the silicone-oil soluble resins mentioned above for use in the ninth embodiment.

In the sixteenth embodiment, an image display medium containing a dispersion including a silicone oil solvent, colored particles having an acidic group and optionally a nonionic polar group on the surface thereof, and a resin which can be dissolved in the silicone oil solvent and which has a basic group and optionally a nonionic polar group is provided. In this dispersion, acid-base dissociation takes place at the interface between the colored particles and the resin. In addition, when the colored particles and/or the resin have a nonionic polar group, ions are formed at the interface between the colored particles and the resin while solvation takes place. Thereby the colored particles can be uniformly charged negatively, and in addition, the colored particles can be dispersed more stably due to the synergy effect of the electrostatic effect and the steric effect.

As the colored particles, colored particles mentioned above for use in the thirteenth embodiment and fourteenth embodiment can be used. In addition, as the resin soluble in silicone oils, the silicone-oil soluble resins mentioned above for use in the fifth to eighth embodiments can be used.

In the seventeenth embodiment, an image display medium containing a dispersion including a silicone oil solvent, colored particles having a basic group and optionally a nonionic polar group on the surface thereof but not having an acidic group, and a silicone-oil soluble resin which has an acidic group and optionally a nonionic polar group but does not a basic group is provided. In this dispersion, acid-base dissociation takes place at the interface between the colored particles and the resin. In addition, when the colored particles and/or the resin have a nonionic polar group, ions are formed at the interface between the colored particles and the resin while salvation takes place. Thereby the colored particles can be uniformly charged positively, and in addition, the colored particles can be dispersed more stably due to the synergy effect of the electrostatic effect and the steric effect.

As the colored particles, colored particles mentioned above for use in the thirteenth embodiment and fourteenth embodiment can be used. In addition, as the resin soluble in silicone oils, the silicone-oil soluble resins mentioned above for use in the first to fourth embodiments can be used.

In the image display medium of the present invention, the average particle diameter of the colored particles is preferably from 0.1 μm to 10 μm, and more preferably from 0.2 μm to 5 μm. The smaller average particle diameter the colored particles have, the better the resolution of the image. However, the cohesive force of the particles increases, and thereby it becomes difficult to stably disperse the particles. To the contrary, when the particles have too a large average particle diameter, the resolution of the resultant images deteriorates although the dispersiblity of the particles is good.

In the present invention, the colored particles preferably include solid particles such as metal oxides or a color pigment and a binder resin, wherein the weight ratio (P/R) of total (P) of the solid particles and color pigment to the resin (R) is preferably from 0.1/10 to 300/10, and more preferably from 1/10 to 100/10. When the content of the solid particles and pigment is too large, images having high image density (i.e., a high contrast) can be displayed but the content of the resin which can induce acid-base dissociation is low, the charge quantity of the colored particles decreases and thereby the response speed of the display medium deteriorates. To the contrary, when the content of the particles and pigment is low, the response speed can be enhanced but the contrast of the resultant images deteriorates.

Specific examples of suitable solid particles include titanium oxide, aluminum oxide, zinc oxide, and silica. Among these particles, titanium oxide is more preferable.

The water content of the dispersion of the image display medium is preferably from 100 to 2000 ppm based on total weight of the dispersion. Silicone oils typically absorb moisture in air and therefor include a small amount of water. It is preferable to add a small amount of water to a silicone oil solvent to control the water content in the above-mentioned range. When the water content is too small, the quantity of the ions generated decreases, resulting in deterioration of the response speed. To the contrary, when the water content is too large, it become impossible to uniformly mix water with a silicone oil.

Figure 4:
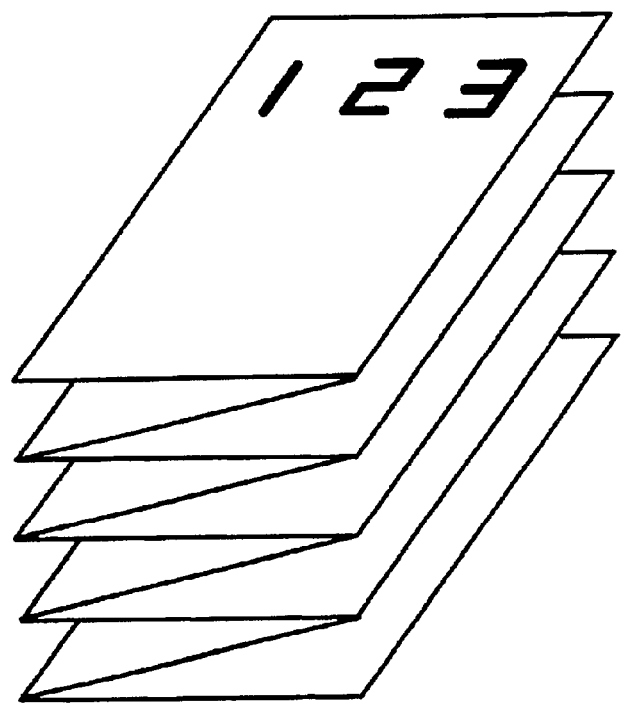
FIG. 4 is a schematic view illustrating the cross section of another embodiment of the image display medium of the present invention.

FIG. 4 is a schematic view illustrating yet another embodiment of the image display medium of the present invention. The image display medium has a fanfold shape (a so-called digital paper). In order to display images in the medium, a charge (voltage) is applied to the medium from outside. The information displayed therein can be preserved for a long period of time. In addition, the medium is rewritable as mentioned above.

Figure 5:
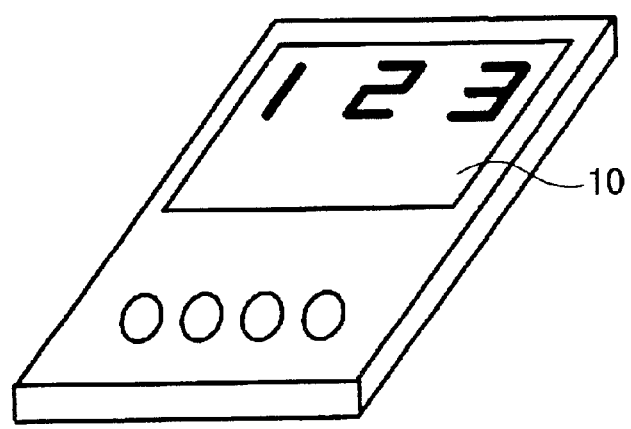
FIG. 5 is a schematic view illustrating an embodiment of the image display device of the present invention.

FIG. 5 is a schematic view illustrating an embodiment of the image display device of the present invention. This display device shapes like a pocket personal computer. The display device has an image display medium 10, which is the image display medium of the present invention, and a voltage applicator (not shown) inside the device. The display device may have a connector through which a voltage is applied to the device to display images, instead of the voltage applicator.

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Examples 1 to 8
Preparation of Polymers for Use in Dispersion

In a flask having a stirrer, a thermometer and a reflux condenser, 300 parts of a silicone oil (SH200, manufactured by Dow Corning Toray Silicone Co., Ltd. and having a viscosity of 1 cs) were contained and then heated to 80° C. Next, each of the mixtures as shown in Table 3 was dropped therein for 1 hour while stirring the mixture in the container. The mixture was further stirred at the temperature for 5 hours. Thus, the reaction was completed. After the reaction, the solvent (i.e., the silicone oil) was removed from the polymer solution to obtain a polymer. The polymerization rate and the average molecular weight of the resultant copolymers are shown in Table 4.

TABLE 3

| | Monomer having formula (1) | Monomer having acidic group | Monomer having formula (2) | Monomer having nonionic polar group | Initiator |
|---|---|---|---|---|---|
| Example 1 | $R_1$: —$CH_3$ $R_2$: —$C_4H_9$ x: 3 Mn: about 1000 48 parts | Methacrylic acid 2 parts | None | none | Azobis-iso-butylo-nitrile 1 part |
| Example 2 | $R_1$: —$CH_3$ $R_2$: —$C_4H_9$ x: 3 Mn: about 5000 48 parts | Methacrylic acid 1 part | None | 2-hydroxy-ethyl-methacylate 1 part | Azobis-iso-butylo-nitrile 1 part |
| Example 3 | $R_1$: —$CH_3$ $R_2$: —$C_4H_9$ x: 3 Mn: about 1000 46 parts | Methacrylic acid 2 parts | $R_3$: —$CH_3$ $R_4$: —$CH_3$ X: 2 Y: 2 2 parts | none | Benzoyl-peroxide 1 part |
| Example 4 | $R_1$: —$CH_3$ $R_2$: —$C_4H_9$ x: 3 Mn: about 5000 44 parts | Methacrylic acid 2 parts | $R_3$: —$CH_3$ $R_4$: —$CH_3$ X: 2 Y: 4 2 parts | Vinyl-pyrro-lidone 1 part | Azobis-iso-butylo-nitrile 5 parts |
| Example 5 | $R_1$: —$CH_3$ $R_2$: —$C_4H_9$ x: 3 Mn: about 1000 45 parts | Dimethyl-amino-ethyl-methacrylate 5 parts | None | None | Azobis-iso-butylo-nitrile 3 parts |
| Example 6 | $R_1$: —$CH_3$ $R_2$: —$C_4H_9$ x: 3 Mn: about 1000 47 parts | Diethyl-amino-ethyl-methacrylate 2 parts | None | N-acryloyl-morpho-rine 1 part | Azobis-iso-butylo-nitrile 3 parts |
| Example 7 | $R_1$: —$CH_3$ $R_2$: —$C_4H_9$ x: 3 Mn: about 5000 42 parts | Dimethyl-amino-ethyl-methacrylate 5 parts | $R_3$: —$CH_3$ $R_4$: —$CH_3$ X: 2 Y: 4 3 parts | None | Benzoyl-peroxide 3 parts |
| Example 8 | $R_1$: —$CH_3$ $R_2$: —$C_4H_9$ x: 3 Mn: about 10000 44 parts | Dimethyl-amino-ethyl-methacrylate 2 parts | $R_3$: —$CH_3$ $R_4$: —H X: 2 Y: 1 4 parts | Vinyl-pyrro-lidone 1 part | Benzoyl-peroxide 1 part |

TABLE 4

| | Polymerization rate (%) | Average molecular weight |
|---|---|---|
| Example 1 | 98.2 | 14200 |
| Example 2 | 94.1 | 33700 |
| Example 3 | 92.9 | 17300 |
| Example 4 | 95.4 | 24500 |

TABLE 4-continued

|  | Polymerization rate (%) | Average molecular weight |
|---|---|---|
| Example 5 | 99.1 | 23300 |
| Example 6 | 95.5 | 26400 |
| Example 7 | 93.3 | 41100 |
| Example 8 | 94.7 | 52800 |

Examples 9 to 16
Preparation of Binder Resin A

In a flask having a stirrer, a thermometer and a reflux condenser, 500 parts of a silicone oil (SH200, manufactured by Dow Corning Toray Co., Ltd. and having a viscosity of 1 cs) were contained and then heated to 85° C. Next, a mixture solution of 5 parts of methacryloxypropyl-modified dimethylpolysiloxane, 5 parts of diethylaminoethyl methacrylate, 40 parts of methyl methacrylate and 3 parts of azobisisobutylonitirile was dropped therein for 1.5 hours while stirring the mixture in the flask. The mixture was heated to 90° C. and further stirred for 4 hours to complete the reaction. Then the silicone oil was evaporated to prepare a binder resin A. The polymerization rate or the reaction was 98.2%.

Preparation of Binder Resin B

In a flask having a stirrer, a thermometer and a reflux condenser, 500 parts of a silicone oil (SH200, manufactured by Dow Corning Toray Co., Ltd. and having a viscosity of 1 cs) was contained and then heated to 80° C. Next, a mixture solution of 20 parts of methacryloxypropyl-modifed dimethylpolysiloxane, 20 parts of ethylglycol dimethacrylate, 5 parts of vinyl pyrrolidone, 5 parts of dimethylaminoethyl methacryalte and 5 parts of azobisisobutylonitirile was dropped therein for 3 hours while stirring the mixture in the flask. The mixture was heated to 85° C. and further stirred for 4 hours to complete the reaction. Then the silicone oil was evaporated to prepare a binder resin B. The polymerization rate or the reaction was 94.5%.

Preparation of Binder Resin C

In a flask having a stirrer, a thermometer and a reflux condenser, 500 parts of a silicone oil (SH200, manufactured by Dow Corning Toray Co., Ltd. and having a viscosity of 1 cs) was contained and then heated to 85° C. Next, a mixture solution of 5 parts of methacryloxypropyl-modifed dimethylpolysiloxane, 5 parts of methacrylic acid, 40 parts of methyl methacrylate and 3 parts of azobisisobutylonitirile was dropped therein for 1.5 hours while stirring the mixture in the flask. The mixture was heated to 90° C. and further stirred for 4 hours to complete the reaction. Then the silicone oil was evaporated to prepare a binder resin C. The polymerization rate or the reaction was 96.4%.

Preparation of Binder Resin D

In a flask having a stirrer, a thermometer and a reflux condenser, 500 parts of a silicone oil (SH200, manufactured by Dow Corning Toray Co., Ltd. and having a viscosity of 1 cs) was contained and then heated to 80° C. Next, a mixture solution of 20 parts of methacryloxypropyl-modifed dimethylpolysiloxane, 20 parts of ethyleneglycol dimethacrylate, 5 parts of lauryl methacrylate, 5 parts of styrene sulfonic acid and 5 parts of azobisisobutylonitirile was dropped therein for 3 hours while stirring the mixture in the flask. The mixture was heated to 85° C. and further stirred for 4 hours to complete the reaction. Then the silicone oil was evaporated to prepare a binder resin C. The polymerization rate or the reaction was 90.1%.

Preparation of Dispersion and Display Cell

Eight (8) parts of a binder resin (listed in Table 5) and 2 parts of titanium oxide were mixed with 100 parts of a solvent (listed in Table 5), and the mixture was subjected to a dispersion treatment for 24 hours using a ball mill. One tenth (0.1) parts of a dye (MACROLEX BLUE RR manufactured Bayer AG) and 10 parts of one (as shown in Table 5) of the copolymers prepared above in Examples 1 to 8, which was soluble in the solvent, were added to the dispersion, and the mixture was subjected to supersonic dispersion treatment for 1 hour.

A polyester film having a thickness of 100 μm and an opening of 1 cm square was sandwiched by two substrates each having an ITO electrode to form a cell having a thickness of 100 μm and an area of 1 cm². Then the dispersion prepared above was contained in the cell.

Displaying Image

A voltage of −100 V was applied to the upper ITO electrode to observe the behavior of the colored particles (i.e., titanium oxide). Then a voltage of +100 V was applied to the upper electrode to observe the behavior of the colored particles. These polarity changing operations were repeated 100 times. In addition, the display medium was observed after the applied voltage was off.

The results are shown in Table 5.

TABLE 5

|  | Binder resin | Copolymer | Solvent *1 | Behavior of particles *2 |
|---|---|---|---|---|
| Ex. 9 | None | Copolymer of Ex. 1 | Solvent A | Δ |
| Ex. 10 | Binder resin A | Copolymer of Ex. 2 | Solvent B | ○ |
| Ex. 11 | Binder resin B | Copolymer of Ex. 3 | Solvent B | ○ |
| Ex. 12 | Binder resin A | Copolymer of Ex. 4 | Solvent B | ○ |
| Ex. 13 | Binder resin C | Copolymer of Ex. 5 | Solvent A | ○ |
| Ex. 14 | None | Copolymer of Ex. 6 | Solvent B | Δ |
| Ex. 15 | Binder resin D | Copolymer of Ex. 7 | Solvent A | ○ |
| Ex. 16 | Binder resin D | Copolymer of Ex. 8 | Solvent B | ○ |
| Comp. Ex. 1 | None | None | Solvent B | X |

*1 Solvent
solvent A: a mixture of dimethylsilicone oil (1 cs) and n-butanol in a weight ratio of 9/1
solvent B: a mixture of methylphenylsilicone oil and ethanol in a weight ratio of 9/1
*2 Behavior of the colored particles
○: The colored particles moved rapidly. When the polarity changing operations were performed 100 times, the movement of the colored particles could be stably repeated. When the voltage was off, the medium kept the state in which the colored particles were deposited on one electrode.
Δ: The response speed was relatively slow but the movement of the colored particles could be stably repeated 100 times. When the voltage was off, the medium kept the state in which the colored particles were deposited on one electrode.
X: The response speed was slow. The movement of the colored particles could be repeated only 10 times.

Example 17
Preparation of Dispersion and Cell

In a flask having a stirrer, a thermometer and a reflux condenser, 300 parts of a silicone oil (SH200, manufactured by Dow Corning Toray Silicone Co., Ltd. and having a viscosity of 2 cs) were contained and then heated to 85° C. Next, 50 parts of methacryloxypropyl-modified dimethylpolysiloxane, 5 parts of diethylaminoethyl methacrylate and 3 parts of azobisisobutylonitrile were dropped therein for 1.5 hours while stirring the mixture in the container. The temperature of the mixture was increased to 90° C. and the mixture was further stirred at the temperature for 4 hours. Thus, the reaction was completed. A clear resin solution was prepared. The polymerization rate was 99.1%.

One hundred (100) parts of the resin solution, 7 parts of titanium oxide and 0.1 parts of a dye (MACROLEX BLUE RR manufactured by Bayer AG.) were mixed and dispersed using a ball mill. Thus a dispersion of Example 17 was prepared.

The procedures for preparation of the image display medium and evaluation of the medium in Example 9 were repeated except that the dispersion was changed to the dispersion of Example 17. The results are shown in Table 6.

Comparative Example 2

The procedures for preparation of the dispersion and image displaying medium and evaluation of the medium in Example 17 were repeated except that the resin solution was replaced with a silicone oil.

The result is shown in Table 6.

Example 18
Preparation of Dispersion and Cell

In a flask having a stirrer, a thermometer and a reflux condenser, 300 parts of a silicone oil (SH200, manufactured by Dow Corning Toray Silicone Co., Ltd. and having a viscosity of 1 cs) were contained and then heated to 80° C. Next, 10 parts of methacryloxypropyl-modified dimethylpolysiloxane, 10 parts of 2-hydroxyethylmethacrylate, 5 parts of styrene sulfonic acid and 3 parts of benzoylperoxide were dropped therein for 5 hours while stirring the mixture in the container. The temperature of the mixture was increased to 85° C. and the mixture was further stirred at the temperature for 2 hours. Thus, the reaction was completed. A milk white resin dispersion was prepared. The polymerization rate was 99.1%.

One hundred (100) parts of the resin dispersion and 0.1 parts of a dye (MACROLEX BLUE RR manufactured by Bayer AG.) were mixed and dispersed using a ball mill. Thus a dispersion of Example 18 was prepared.

The procedures for preparation of the image display medium and evaluation of the medium in Example 9 were repeated except that the dispersion was changed to the dispersion of Example 18. The results are shown in Table 6.

Comparative Example 3

The procedures for preparation of the dispersion and image displaying medium and evaluation of the medium in Example 18 were repeated except that the resin dispersion was prepared without using styrene sulfonic acid. Thus a milk white resin dispersion of Comparative Example 3 was prepared at a polymerization rate of 94.2%.

The procedures for preparation of the image display medium and evaluation of the medium in Example 18 were repeated except that the resin dispersion was replaced with the resin dispersion of Comparative Example 3.

The result is shown in Table 6.

Example 19
Preparation of Dispersion and Cell

In a flask having a stirrer, a thermometer and a reflux condenser, 500 parts of a silicone oil (SH200, manufactured by Dow Corning Toray Silicone Co., Ltd. and having a viscosity of 2 cs) were contained and then heated to 80° C. Next, 10 parts of methacryloxypropyl-modified dimethylpolysiloxane, 30 parts of lauryl methacrylate, 5 parts of lauryl methacrylamide, 5 parts of dibutylaminoethyl methacryalte and 5 parts of azobisisobutylonitrile were dropped therein for 3 hours while stirring the mixture in the container. The temperature of the mixture was increased to 85° C. and the mixture was further stirred at the temperature for 4 hours. Thus, the reaction was completed. A resin dispersion was prepared at a polymerization rate of 94.5%.

In another flask, 500 parts of a silicone oil (SH200, manufactured by Dow Corning Toray Silicone Co. Ltd. and having a viscosity of 2 cs) were contained and then heated to 80° C. Next, 50 parts of methacryloxypropyl-modified dimethylpolysiloxane, 10 parts of butyl methacrylate, 3 parts of methacrylic acid and 5 parts of benzoylperoxide were dropped therein for 2 hours while stirring the mixture in the container. The mixture was further stirred at the temperature for 3 hours. Thus, a clear resin solution was prepared at a polymerization rate of 95.2%.

One hundred (100) parts of the resin dispersion, 60 parts of the clear resin solution and 7 parts of copper phthalocyanine disulfonic acid sodium salt were mixed, and in addition water was added in an amount of 800 ppm. Thus a nonaqueous dispersion of Example 19 was prepared. The water content of this dispersion, which was measured by a Karl Fischer moisture meter, was 920 ppm.

The procedures for preparation of the image display medium and evaluation of the medium in Example 9 were repeated except that the dispersion was changed to the dispersion of Example 19. The results are shown in Table 6.

Comparative Example 4

The procedure for preparation of the resin dispersion in Example 19 was repeated except that dibutylaminoethyl methacrylate was not adapted. Thus, a milk white resin dispersion of Comparative Example 4 was prepared at a polymerization rate of 94.2%. In addition, the procedure for preparation of the resin solution in Example 19 was repeated except that methacrylic acid was not added. Thus a clear resin solution of Comparative Example 4 was prepared at a polymerization rate of 97.7%.

Then the procedures for preparation of the image display medium and evaluation of the medium in Example 19 were repeated except that the resin dispersion and resin solution were replaced with the resin dispersion and resin solution of Comparative Example 4, respectively.

The results are shown in Table 6.

TABLE 6

|  | Behavior of particles *1 |
|---|---|
| Example 17 | ○ |
| Comparative Example 2 | X |
| Example 18 | ○ |
| Comparative Example 3 | X |
| Example 19 | ○ |
| Comparative Example 4 | X |

*1 Behavior of the colored particles
○: The colored particles moved rapidly. When the polarity changing operations were performed 100 times, the movement of the colored particles could be stably repeated. When the voltage was off, the medium kept the state in which the colored particles were deposited on one electrode.
X: The response speed was slow. The movement of the colored particles could be repeated only 10 times.

Effects of the Present Invention

A dispersion for use in an image display medium, which has good electrophoretic properties and dispersion stability, can be provided, by using one of the following copolymers:

(1) copolymers formed of at least a monomer having an acidic group or a basic group and a monomer having formula (1);
(2) copolymers formed of at least a monomer having an acidic group or a basic group, a monomer having formula (1) and a monomer having a nonionic polar group;
(3) copolymers formed of at least a monomer having an acidic group or a basic group and a monomer having formula (1) and a monomer having formula (2); and
(4) copolymers formed of at least a monomer having an acidic group or a basic group, a monomer having formula (1), a monomer having formula (2) and a monomer having a nonionic polar group.

Since the image display medium of the present invention includes a cell and a dispersion including a colored particulate material, a silicone oil and a polymer soluble in the silicone oil, the image display medium can stably display images reversibly for a long period of time and which has a good memory property.

When the silicone-oil soluble polymer is one of the copolymers mentioned above in paragraph (1) and (3), the resultant image display medium can make a quick response to applied voltage.

When the silicone-oil soluble polymer is one of the copolymers mentioned above in paragraph (2) and (4), the resultant image display medium can make a further quick response.

When the colored particulate material has an acidic group or a basic group, the resultant image display medium can make a quick response to the applied voltage.

When the colored particulate material has an acidic group or a basic group and a nonionic polar group, the resultant image display medium can make a further quick response.

When the colored particulate material has an acidic group (or a basic group) and the silicone-oil soluble polymer has a basic group (or an acidic group), the resultant image display medium can exert such an excellent effect as to stably display images reversibly for a long period of time and which can make a quick response.

This document claims priority and contains subject matter related to Japanese Patent Applications Nos. 2001-019234 and 2001-071966, filed on Jan. 26, 2001 and Mar. 14, 2001, respectively, incorporated herein by reference.

Having now fully described the invention, it will be apparent to one of ordinary skill in the art that many changes and modifications can be made thereto without departing from the spirit and scope of the invention as set forth therein.

What is claimed as new and desired to be secured by Letters Patent of the United States is:

1. A polymer comprising units obtained from a monomer having an acidic group or a basic group capable of undergoing an acid-base dissociation in a silicone oil and a monomer having the following formula (1):

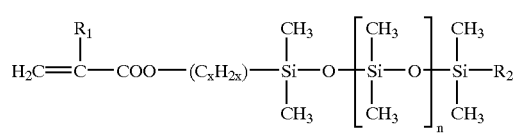

(1)

wherein $R_1$ represents a hydrogen atom or a methyl group; $R_2$ represents a hydrogen atom or an alkyl group having 1 to 4 carbon atoms; n is an integer; and x is an integer of from 1 to 3, wherein the polymer is soluble in a silicone oil;

wherein the monomer having an acidic group or a basic group is a member selected from the group consisting of (meth)acrylic acid, maleic acid, maleic anhydride, itaconic acid, itaconic anhydride, fumaric acid, cinnamic acid, crotonic acid, vinylbenzoic acid, 2-methacryloxyethylsuccinic acid, 2-methacryloxyethylmaleic acid, 2-methacryloxyethylhexahydrophthalic acid, 2-methacryloxyethyltrimellitic acid, vinylsulfonic acid, allylsulfonic acid, styrenesulfonic acid, 2-sulfoethyl methacrylate, 2-acrylamide-2-methylpropanesulfonic acid, 3-chloroamidephosphoxypropyl methacrylate, 2-methacryloyloxyethylacid phosphate, hydroxystyrene, N-methylaminoethyl (meth)acrylate, N-ethylaminoethyl (meth)acrylate, N,N-dimethylaminoethyl (meth)acrylate, N,N-diethylaminoethyl (meth)acrylate, N,N-dibutylaminoethyl acrylate, N-phenylaminoethyl methacrylate, N,N-diphenylaminoethyl methacrylate, aminostyrene, dimethylaminostyrene, N-methylaminoethylstyrene, dimethylaminoethoxystyrene diphenylaminoethylstyrene, N-phenylaminoethylstyrene, 2-N-piperidylethyl (meth)acrylate, 2-vinyl pyridine, 4-vinyl pyridine and 2-vinyl-6-methyl pyridine.

2. The polymer according to claim 1, wherein the polymer further comprises units obtained from a monomer having a nonionic polar group other than oxyalkylene groups and polyoxyalkylene groups.

3. The polymer according to claim 2, wherein the polymer further comprises units obtained from a monomer having the following formula (2):

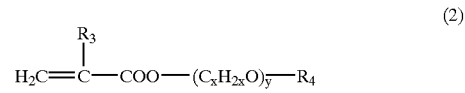

(2)

wherein $R_3$ represents a hydrogen atom or a methyl group; $R_4$ represents a hydrogen atom or an alkyl group having 1 to 4 carbon atoms; x is an integer of from 1 to 3; and y is an integer of from 1 to 25.

4. The polymer according to claim 1, wherein the polymer further comprises units obtained from a monomer having the following formula (2):

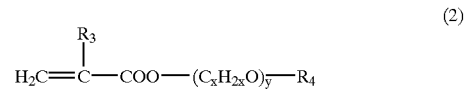

(2)

wherein $R_3$ represents a hydrogen atom or a methyl group; $R_4$ represents a hydrogen atom or an alkyl group having 1 to 4 carbon atoms; x is an integer of from 1 to 3; and y is an integerof from 1 to 25.

5. An image display medium comprising:
a pair of electroconductive layers, at least one of said electroconductive layers being light-transmissive and said electroconductive layers being opposed to each other to form a cell; and
a dispersion contained in the cell, the dispersion comprising:
a silicone oil;
a colored particulate material dispersed in the silicone oil; and
a polymer soluble in the silicone oil;

wherein said polymer soluble in the silicone oil can undergo an acid-base dissociation reaction with said colored particulate material dispersed in the silicone oil; and wherein the polymer comprises units obtained from a monomer having an acidic group or a basic group and a monomer having the following formula (1):

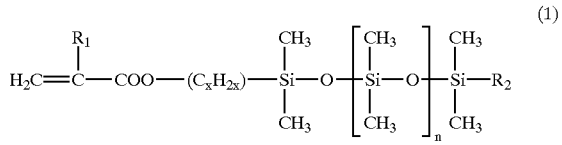

(1)

wherein $R_1$ represents a hydrogen atom or a methyl group: $R_2$ represents a hydrogen atom or an alkyl group having 1 to 4 carbon atoms; n is an integer: and x is an integer of from 1 to 3.

6. The image display medium according to claim 5, wherein the polymer further comprises units obtained from a monomer having a nonionic polar group other than oxyalkylene groups and polyoxyalkylene groups.

7. The image display medium according to claim 6, wherein the polymer further comprises units obtained from a monomer having the following formula (2):

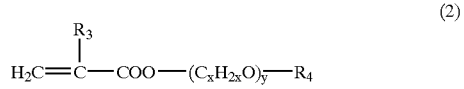

(2)

wherein $R_3$ represents a hydrogen atom or a methyl group; $R_4$ represents a hydrogen atom or an alkyl group having 1 to 4 carbon atoms; x is an integer of from 1 to 3; and y is an integer of from 1 to 25.

8. The image display medium according to claim 5, wherein the polymer further comprises units obtained from a monomer having the following formula (2):

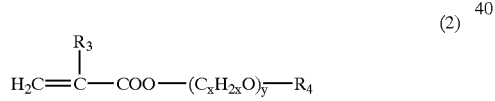

(2)

wherein $R_3$ represents a hydrogen atom or a methyl group; $R_4$ represents a hydrogen atom or an alkyl group having 1 to 4 carbon atoms; x is an integer of from 1 to 3; and y is an integer of from 1 to 25.

9. The image display medium according to claim 5, wherein the colored particulate material comprises a coloring agent and a binder resin insoluble in the silicone oil.

10. The image display medium according to claim 5, wherein the colored particulate material has an average particle diameter of from 0.1 μm to 10 μm.

11. The image display medium according to claim 5, wherein the dispersion further comprises water in an amount of from 100 to 2000 ppm.

12. An image displaying device comprising:

the image displaying medium according to claim 5; and at least one member selected from the group consisting of voltage applicators configured to apply a voltage between the pair of electroconductive layers to display an image in the image display medium and connectors through which a voltage is applied to the medium to display an image in the image display medium.

13. A composition comprising a polymer comprising units obtained from a monomer having an acidic group or a basic group and a monomer having the following formula (1):

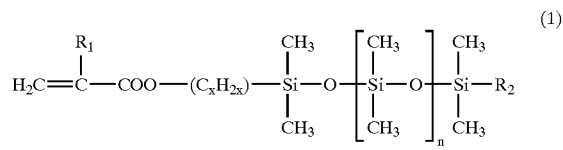

(1)

wherein $R_1$ represents a hydrogen atom or a methyl group; $R_2$ represents a hydrogen atom or an alkyl group having 1 to 4 carbon atoms; n is an integer; and x is an integer of from 1 to 3, a silicone oil; and a colored particulate material dispersed in the silicone oil;

wherein the polymer is soluble in the silicone oil and the polymer and the colored particulate material undergo an acid-base dissociation reaction in the silicone oil.

* * * * *